United States Patent
Martens et al.

(10) Patent No.: US 11,971,385 B2
(45) Date of Patent: Apr. 30, 2024

(54) CYCLIC CAPILLARY ELECTROPHORESIS DEVICE

(71) Applicants: IMEC VZW, Leuven (BE); Katholieke Universiteit Leuven, KU LEUVEN R & D, Leuven (BE)

(72) Inventors: Koen Martens, Aalter (BE); Chengxun Liu, Kessel-lo (BE); Camila Dalben Madeira Campos, Leuven (BE); Rita Vos, Baal (BE)

(73) Assignees: Imec vzw, Leuven (BE); Katholieke Universiteit Leuven, Leuven (BE)

( * ) Notice: Subject to any disclaimer, the term of this patent is extended or adjusted under 35 U.S.C. 154(b) by 251 days.

(21) Appl. No.: 17/018,368

(22) Filed: Sep. 11, 2020

(65) Prior Publication Data
US 2021/0080427 A1 Mar. 18, 2021

(30) Foreign Application Priority Data
Sep. 16, 2019 (EP) .................................... 19197451

(51) Int. Cl.
*G01N 27/447* (2006.01)
(52) U.S. Cl.
CPC . *G01N 27/44752* (2013.01); *G01N 27/44791* (2013.01)
(58) Field of Classification Search
CPC ....... G01N 27/44752; G01N 27/44791; G01N 27/44704
See application file for complete search history.

(56) References Cited

U.S. PATENT DOCUMENTS

| 6,803,019 B1* | 10/2004 | Bjornson ............ B01L 3/50273 422/66 |
| 9,728,387 B2 | 8/2017 | Mellors et al. |
| 2002/0056639 A1 | 5/2002 | Lackritz et al. |
| 2004/0091943 A1* | 5/2004 | Schneider ........ G01N 27/44782 435/7.1 |

(Continued)

FOREIGN PATENT DOCUMENTS

| KR | 20010104172 A | 11/2001 |
| WO | 200028315 A1 | 5/2000 |

(Continued)

OTHER PUBLICATIONS

J-G Choi, Electrophoretron: a new method for enhancing resolution in electrokinetic separations; Journal of Chromatography A, 2001, 924, p. 53-58. (Year: 2001).*

(Continued)

*Primary Examiner* — Caitlyn Mingyun Sun
(74) *Attorney, Agent, or Firm* — McDonnell Boehnen Hulbert & Berghoff LLP

(57) ABSTRACT

A cyclic capillary electrophoresis device includes a capillary channel that forms a closed loop. The capillary channel comprises an inner half facing toward a space enclosed by the loop, where the inner half having an inner wall of first charge density, and an outer half facing away from the space enclosed by the loop, where the outer half having an inner wall surface of second charge density. A difference between the first and the second charge densities exists or can be turned on. The difference is configured to create a smaller average electroosmotic flow velocity in the inner half than in the outer half.

20 Claims, 6 Drawing Sheets

(56) References Cited

U.S. PATENT DOCUMENTS

| | | |
|---|---|---|
| 2005/0130157 A1 | 6/2005 | Serwer et al. |
| 2014/0031995 A1 | 1/2014 | Kawai et al. |
| 2018/0158662 A1* | 6/2018 | Mellors ................ H01J 49/167 |

FOREIGN PATENT DOCUMENTS

| | | | | |
|---|---|---|---|---|
| WO | WO-0028315 A1 * | 5/2000 | ....... | G01N 27/44752 |
| WO | 200106247 A1 | 1/2001 | | |

OTHER PUBLICATIONS

Wang, Sea-Fue, Yung-Fu Hsu, Thomas CK Yang, Chia-Mei Chang, Yuhen Chen, Chi-Yuen Huang, and Fu-Su Yen. "Silica coating on ultrafine α-alumina particles." Materials Science and Engineering: A 395, No. 1-2 (2005): 148-152.

Extended European Search Report and Written Opinion, EP Application No. 19197451.8, dated Mar. 26, 2020, 9 pages.

Burggraf, Norbert, Andreas Manz, Carlo S. Effenhauser, Elisabeth Verpoorte, Nico F. de Rooij, and H. Michael Widmer. "Synchronized cyclic capillary electrophores—a novel approach to ion separations in solution." Journal of High Resolution Chromatography 16, No. 10 (1993): 594-596.

Choi, Joong-Gill, Miyeon Kim, Rajeev Dadoo, and Richard N. Zare. "Electrophoretron: a new method for enhancing resolution in electrokinetic separations." Journal of Chromatography A 924, No. 1-2 (2001): 53-58.

* cited by examiner

FIG 5A
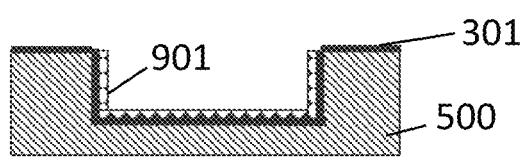
FIG 5B
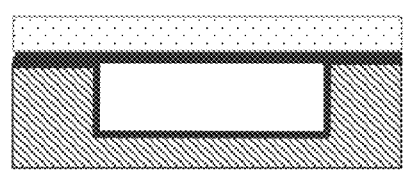
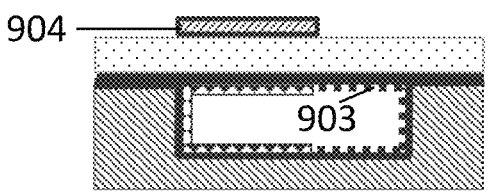
FIG 5C

CYCLIC CAPILLARY ELECTROPHORESIS DEVICE

CROSS-REFERENCE TO RELATED APPLICATIONS

The present application is a non-provisional patent application claiming priority to European Patent Application No. 19197451.8, filed Sep. 16, 2019, the contents of which are hereby incorporated by reference.

FIELD OF THE DISCLOSURE

This application relates to capillary electrophoresis and, in particular, to devices designed for cyclic capillary electrophoresis.

BACKGROUND

Capillary electrophoresis (CE) is an electrokinetic separation method performed in submillimeter diameter capillaries. Capillary electrophoresis can be integrated on a chip, e.g., using a micro or nanofluidic channel as capillary, to obtain a miniaturized portable separation solution. Applications of such capillary electrophoresis chips include the separation of biomolecules, for example, for use in mobile point-of-care devices. However, if one wants to reach resolutions on the order of, for example, a single DNA base pair, on-chip capillary electrophoresis poses several challenges. First, a large chip footprint is required because a capillary electrophoresis channel with a length of about 10 cm or more is currently needed to achieve such a resolution. Furthermore, the optimal field for such a resolution corresponds to about 150-250 V/cm. Such high voltages are difficult to handle on-chip and particularly in mobile point-of-care devices.

Lower, more manageable voltages can be applied if the capillary is miniaturized. This can be achieved in cyclic capillary electrophoresis, where the capillary forms a closed loop subdivided into sections (e.g., four sections), and the analyte is moved from one section to the next, and thus through the closed loop, by applying an electrical bias over each section in a cyclic fashion. In this manner, an infinite separation channel is realized while allowing the use of lower voltages over the sections. Such a device is, for example, disclosed in KR20010104172A.

However, the closed loop implies that the capillary comprises one or more turns. This results in a difference in path length for analytes moving closer to an inner portion of the turn(s) as compared to those moving closer to an outer portion thereof. This is detrimental to the resolution of the method, as it results in continuous broadening and, eventually, overlapping of analyte peaks, so that single base pair resolutions cannot, for example, be achieved.

Thus, there is a need in the art for cyclic capillary electrophoresis devices, which address some or all of the problems outlined above.

SUMMARY

It is an object of the disclosure to provide good devices for cyclic capillary electrophoresis. It is an object of the disclosure to provide good usage associated therewith. This objective is accomplished by devices, methods, and uses according to various disclosed embodiments.

In some embodiments, peak broadening and the related deterioration in peak separation can be countered. In some embodiments, a relatively high resolution can be achieved (e.g., a single base-pair resolution for oligomers).

In some embodiments, the cyclic capillary electrophoresis device can have a relatively small footprint. In some embodiments, an efficient and portable point-of-care device can be realized.

In some embodiments, the cyclic capillary electrophoresis device can be adapted to the operating conditions (e.g., pH) under which the device is or expected to be used. In some embodiments, the cyclic electrophoresis device can be adapted on-demand to different operating conditions.

In some embodiments, the capillary electrophoresis device can be fabricated in a relatively straightforward and economical fashion.

A first aspect relates to a cyclic capillary electrophoresis device comprising a capillary channel forming a closed loop. The capillary channel comprises:

An inner half facing toward a space enclosed by the loop, the inner half having an inner wall surface of first charge density, and An outer half facing away from the space enclosed by the loop, the outer half having an inner wall surface of second charge density.

A difference between the first and the second charge densities exist or can be turned on. The difference is adapted for creating a smaller average electroosmotic flow velocity in the inner half than in the outer half.

A second aspect relates to a method for forming a cyclic capillary electrophoresis device according to any embodiment of the first aspect. The method comprises:

a. Forming a capillary channel in a substrate, the capillary channel forming a closed loop. The capillary channel comprises:

An inner half facing toward a space enclosed by the loop, the inner half having an inner wall surface, and An outer half facing away from the space enclosed by the loop, the outer half having an inner wall surface;

b'. Forming in the substrate a first charges-inducing structure capable of being turned on to induce charges on at least part of the inner wall surface of the inner half, and/or forming in the substrate a second charges-inducing structure capable of being turned on to induce charges on at least part of the inner wall surface of the outer half, and/or b''. modifying a material composition of the inner wall surface of the inner half and/or of the inner wall surface of the outer half, said modification creating a difference in charge density between the inner wall surface of the inner half and the inner wall surface of the outer half; and c. Bonding a cover to the substrate, thereby closing the capillary channel.

A third aspect relates to the use of a cyclic capillary electrophoresis device as defined in any embodiment of the first aspect, for equalizing a migration time in the inner half and the outer half.

Various aspects are set out in the accompanying independent and dependent claims. Features from the dependent claims may be combined with features of the independent claims and with features of other dependent claims as appropriate and not merely as explicitly set out in the claims.

Although there has been constant improvement, change, and evolution of devices in this field, the present concepts are believed to represent substantial new and novel improvements, including departures from prior practices, resulting in the provision of more efficient, stable, and reliable devices of this nature.

The above and other characteristics and features will become apparent from the following detailed description, taken in conjunction with the accompanying drawings, which illustrate, by way of example, various aspects of the disclosure. This description is given for the sake of example only, without limiting the scope of the claims. The reference figures quoted below refer to the attached drawings.

BRIEF DESCRIPTION OF THE FIGURES

The above, as well as additional, features, will be better understood through the following illustrative and non-limiting detailed description of example embodiments, with reference to the appended drawings.

FIGS. 3A-3E are further schematic depictions of the fabrication of cyclic capillary electrophoresis devices, in accordance with example embodiments FIG. 4 schematically shows a capillary channel forming a closed loop and identifies its inner half and its outer half in accordance with example embodiments.

FIGS. 5A-5C are further schematic depictions of the fabrication of cyclic capillary electrophoresis devices, in accordance with example embodiments

DETAILED DESCRIPTION

Figure 1A:
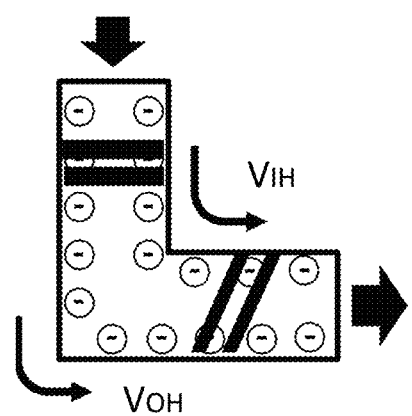
FIGS. 1A-1C schematically show the effect of the surface charge in a curved portion of a capillary channel, in accordance with example embodiments.

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

The terms first, second, third, and the like in the description and in the claims, are used for distinguishing between similar elements and not necessarily for describing a sequence, either temporally, spatially, in ranking, or in any other manner. It is to be understood that the terms so used are interchangeable under appropriate circumstances and that the embodiments described herein are capable of operation in other sequences than described or illustrated herein.

It is to be noticed that the term "comprising," used in the claims, should not be interpreted as being restricted to the means listed thereafter. The term is not understood to exclude other elements or steps. It is thus to be interpreted as specifying the presence of the stated features, integers, steps or components as referred to, but does not preclude the presence or addition of one or more other features, integers, steps or components, or groups thereof. The term "comprising," therefore, covers the situation where only the stated features are present and the situation where these features and one or more other features are present. Thus, the scope of the expression "a device comprising means A and B" should not be interpreted as being limited to devices consisting only of components A and B. Other components can be included.

Similarly, the term "coupled" comprises the meaning of the term "connected" but should not necessarily be interpreted as corresponding to a direct connection. The terms "coupled" and "connected," along with their derivatives, may be used. It should be understood that these terms are not intended as synonyms for each other. Thus, the scope of the expression "a device A coupled to a device B" should not be limited to devices or systems wherein an output of device A is directly connected to an input of device B. Rather, a path between an output of A and an input of B may exist and the path may include other devices or means. "Coupled" may mean that two or more elements are either in direct physical or electrical contact, or that two or more elements are not in direct contact with each other but still cooperate or interact with each other. As used herein, and unless provided otherwise, when two entities are said to be "fluidly coupled," a path exists between both entities that allows a fluid (e.g., a liquid) to flow from the first entity to the second entity.

Reference throughout this specification to "one embodiment" or "an embodiment" indicate that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner, as would be apparent to one of ordinary skill in the art from this disclosure, in one or more embodiments.

Similarly, it should be appreciated that in the description of certain embodiments, various features are sometimes grouped together in a single embodiment, figure, or description thereof for the purpose of streamlining the disclosure and aiding in the understanding of one or more of the various aspects. This method of disclosure, however, is not to be interpreted as reflecting an intention that more features are required in the claims than are expressly recited in each claim. Rather, as the following claims reflect, not all the features of a single foregoing disclosed embodiment are required. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to fall within the scope of the claims, and form different embodiments, as would be understood by those in the art. For example, in the following claims, any of the claimed embodiments can be used in any combination.

In the description provided herein, numerous specific details are set forth. However, it is understood that the embodiments may be practiced without these specific details. In other instances, well-known methods, structures, and techniques have not been shown in detail in order not to obscure an understanding of this description.

As used herein, the "electroosmotic flow" is the motion of electrolyte induced by an applied potential.

As used herein, the term "electroosmotic flow velocity" is the speed of the electrolyte moved by an applied potential.

As used herein, the term "average electroosmotic flow velocity" is the average speed of the electrolyte moved by an applied potential.

Figure 4:
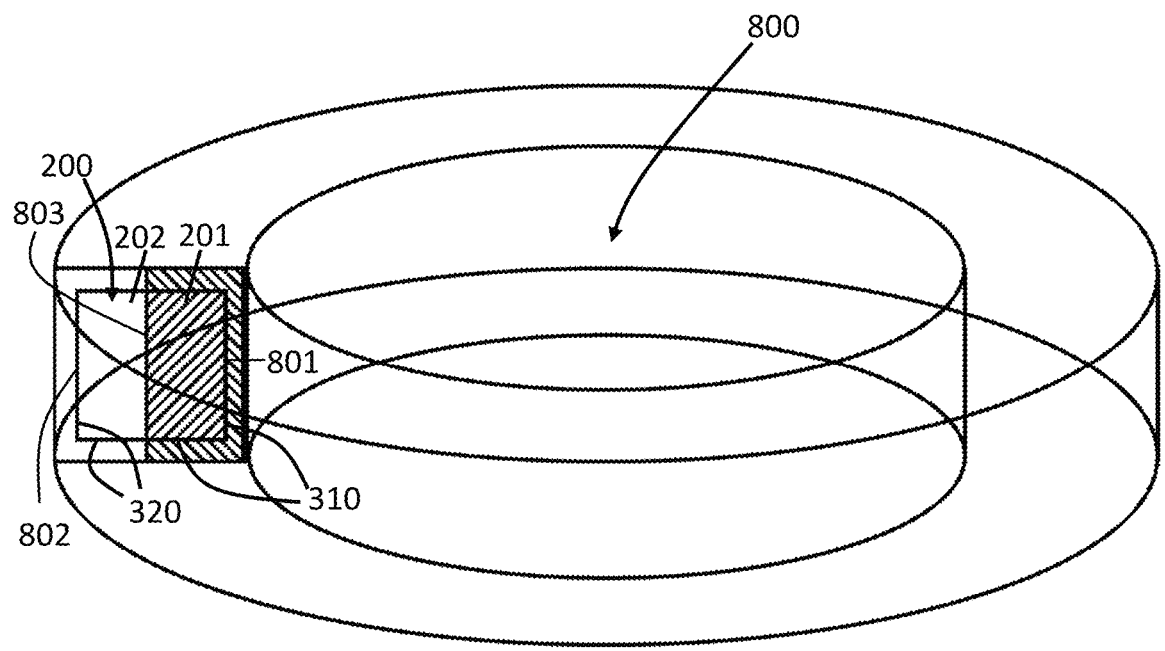

FIG. 4 illustrates a capillary channel. As shown, an inner half (201) faces toward a space (800) enclosed by the loop (i.e., enclosed by the innermost perimeter of the loop) formed by the channel (200). The inner half (201) includes an inner wall surface (310) having a first charge density. An outer half (202) faces away from the space (800) enclosed by the loop formed by the channel (200). The outer half (202) includes an inner wall surface (320) having a second charge density. The capillary channel (200) is virtually separated in two halves (201, 202), the inner half (201), and the outer half (202). The channel (200) has an innermost perimeter (801) and an outermost perimeter (802). The innermost perimeter (801) belongs to the inner half (201), and the outermost perimeter (802) belongs to the outer half (202). A virtual perimeter (803) is defined mid-distance between the innermost perimeter (801) and the outermost perimeter (802) and runs parallel to both perimeters (801, 802). This virtual perimeter (803) demarcates the inner half (201) and the outer half (202). The inner half (201) is a part of a channel (200) situated between the virtual perimeter (803) and the innermost perimeter (801), while the outer half (202) is the part of a channel (200) situated between the virtual perimeter (803) and the outermost perimeter (802).

Although the demarcation between the inner half and the outer half can, as illustrated in FIG. 4, be placed midway between the innermost perimeter and the outermost perimeter, it should be understood that the demarcation can be placed at any other position along the distance separating the innermost perimeter and the outermost perimeter, except for the innermost and outermost perimeters themselves. Indeed, regardless of whether this demarcation is placed closer or farther from midway, the inner half will face toward the space enclosed by the loop, and a smaller average electroosmotic flow velocity will be desired in the inner half to compensate for the smaller path length associated therewith.

As used herein, and unless provided otherwise, the term "velocity" refers to "linear velocity."

As used herein, the charge density of an inner wall surface relates to the density of charges belonging to the material constituting that inner wall or covalently bound thereto and rather than charges belonging to the electrolyte or any species transported therein (such as the analyte) that might adsorb on that inner wall surface.

A first aspect relates to a cyclic capillary electrophoresis device comprising a capillary channel forming a closed loop. The capillary channel comprises:
an inner half facing toward a space enclosed by the loop, the inner half having an inner wall surface of first charge density, and
an outer half facing away from the space enclosed by the loop, the outer half having an inner wall surface of second charge density.

A difference between the first and the second charge densities exist or can be turned on. The difference is configured to create a smaller average electroosmotic flow velocity in the inner half than in the outer half.

In embodiments, the capillary channel may contain an electrolyte. The electrolyte is an ionic solution. The electrolyte may be a buffer solution. The electrolyte typically has a sample to be analyzed dissolved therein (e.g., in a fraction thereof). The sample to be analyzed typically comprises one or more analytes. Examples of analytes are polynucleotide strands, oligonucleotide strands, proteins, peptides, amino acids, and polysaccharides. In embodiments, the cyclic capillary channel may contain a sieving matrix. An example of the sieving matrix is a gel. An example of the gel is a molecular structure swelled by the electrolyte.

Figure 1B:
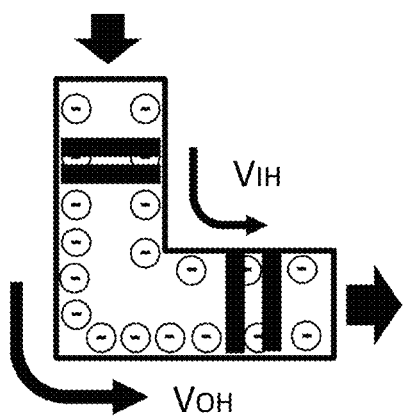
Figure 1C:
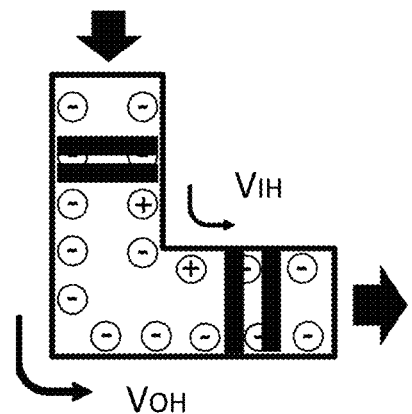

In capillary electrophoresis, the direction of the electroosmotic flow typically depends on the sign of the (e.g., surface) charge density of the channel walls. For example, with positively charged walls, the electrolyte may flow in one direction, while for negatively charged walls, the electrolyte may flow in the opposite direction. Moreover, the average electroosmotic flow velocity is proportional to the charge density at the channel wall. I.e., the flow velocity of the electrolyte increases as the walls are more charged and decreases when they are closer to electrical neutrality. It was surprisingly realized that this effect can be leveraged by (e.g., locally) changing the charge density at the channel inner wall surface to (e.g., locally) tune the average electroosmotic flow velocity. In particular, the difference in the path length in the inner and outer half of a capillary channel can then be compensated for by tuning the ratio between the average electroosmotic flow velocity in the inner half and in the outer half. This is schematically shown in FIGS. 1A-1C. FIG. 1A depicts the situation for an equal first and second charge density with corresponding equal electroosmotic flow velocities in the inner ($V_{IH}$) and outer ($V_{OH}$) halves. This results in a slanted sample peak front after a turn, and thus to intermixing of the peaks and deterioration of the peak separation. However, by increasing the flow velocity in the outer half, as illustrated in FIG. 1B, or decreasing the flow velocity in the inner half as illustrated in FIG. 1C, respectively by increasing the second charge density (depicted as additional negative charges) or decreasing the first charge density (depicted as positive charges neutralizing the negative ones), the migration times of identical analytes in the inner and outer halves can be equalized and the sample peak front can be kept perpendicular to the flow direction.

For determining that a smaller average electroosmotic flow velocity has been created in the inner half (201) than in the outer half (202), it suffices to compare the angle made by a pure analyte front with respect to the electrolyte flow after one lap or after one turn in the presence of the difference between the first and second charge densities and in absence thereof. If, in the presence of the difference between the first and second charge densities, the pure analyte front is now oriented in a direction closer to a perpendicular to the electrolyte flow direction than in the absence of that difference, the difference between the first and second charge densities has created a smaller average electroosmotic flow velocity in the inner half than in the other half.

In embodiments, the difference may be adapted for achieving the same migration time to close the loop for an analyte in the inner half than for the same analyte in the outer half.

In some embodiments, the inner wall surface of the outer half may be negatively charged or can be turned on to become negatively charged. In other embodiments, the inner wall surface of the outer half may be positively charged or can be turned on to become positively charged. In such scenarios, the inner wall surfaces of both halves may have the same charge sign (i.e., both positive or both negative) or can be turned on to have the same sign, or one may be charged (or can be turned on to be so) while the other is neutral. In some instances, the inner wall surfaces of both halves are negatively charged, or the inner wall surface of the inner half may be neutral, and the inner wall surface of the outer half is negatively charged. In some examples, oppositely charged inner and outer halves are not used to avoid having an irregular flow (e.g., because the preferred flow direction in both halves would be the opposite).

In embodiments, the difference may be such that the first charge density may be (or may be turned on to be) closer to neutral than the second charge density. In some examples, since the path length in the inner half is shorter than the path length in the outer half, in order to bring the migration time in both halves more in line with one another, the inner wall surface of the outer half may have a higher charge density than the inner wall surface of the inner half, so as to increase the flow velocity in the outer half compared to the inner half.

There are multiple ways to realize the difference in charge densities. In a first type of embodiment, the cyclic capillary electrophoresis device may comprise a first charge-inducing structure capable of being turned on to induce charges on at least part of the inner wall surface of the inner half (and not on the inner wall surface of the outer half), and/or a second charge-inducing structure capable of being turned on to induce charges on at least part of the inner wall surface of the outer half (and not on the inner wall surface of the inner half). In embodiments, the first and/or the second charge-inducing structure may comprise (e.g., each comprises) an electrode and a dielectric in-between the electrode and the lumen of the capillary channel. The dielectric may be a wall of the capillary channel (in which case the charge-inducing structure is composed of an electrode on a wall of the capillary channel) or a layer provided between the electrode and a wall of the capillary channel (in which case the charge-inducing structure is composed of a dielectric layer on a wall of the capillary channel and of an electrode on that dielectric layer). The charge-inducing structure(s) may operate in a similar fashion as a conventional capacitor (i.e., the charge-inducing may form a capacitive structure), with the electrolyte in the capillary channel acting as a second electrode to realize a typical arrangement of two opposing electrodes separated by the dielectric. In this embodiment, the charge density and thus the average electroosmotic flow velocity can be adapted after device fabrication (e.g., on-demand), thereby facilitating adjustment of these parameters as a function of changes in operating conditions (e.g., a change in the pH of the electrolyte used). However, this flexibility may entail a more complicated device operation, in which the first and second charge densities may still have to be adjusted prior to or during operation. In some examples, both the first and the second charge-inducing structures are present, thereby facilitating control of both the first and the second charge densities and thus better control the average electroosmotic flow velocity in both halves. Nevertheless, in some examples, it is sufficient to have only the first or the second charge-inducing structure, thus controlling only the corresponding charge density while keeping the other charge density relatively constant. With a view on equalizing the electroosmotic migration time in both halves, suitable settings can be determined (e.g., a suitable voltage over the electrode) via simulations (e.g., computer simulations) or trial-and-error. In some embodiments, suitable potential differences between the electrode and the electrolyte may be from 0.3 kV to 1 kV.

In a second type of embodiment, at least part of the inner wall surface of the inner half may have a first material composition, and at least part of the inner wall surface of the outer half may have a second material composition that is different than the first material composition. When only part of the inner wall surface of the inner half has a first material composition, and only part of the inner wall surface of the outer half has a second material composition that is different than the first material composition, the part of the inner wall surface of the inner half and the part of the inner wall surface of the outer half could belong to the same piece that forms the capillary channel. For instance, if the capillary channel is formed of one piece, it is typically sufficient if the part of the inner wall surface of the inner half and the part of the inner wall surface of the outer half both belong to the inner wall of the channel. However, if the capillary channel is formed of two pieces, as is the case when the capillary channel is formed of a substrate comprising a channel having an open top, and of a flat top cover closing the channel, e.g., when the bottom of the channel is etched in a substrate, and the top of the channel is provided by bonding the substrate with a top cover, the part of the inner wall surface of the inner half and the part of the inner wall surface of the outer half could both belong to the same piece, i.e., both belong to the substrate or to the top cover.

In embodiments, the part of the inner wall surface of the inner half and the part of the inner wall surface of the outer half are present on corresponding locations of the inner half and the outer half, respectively.

In embodiments, at least part of the inner wall surface of the inner half or of the outer half may comprise $Al_2O_3$ (e.g., $\alpha$-$Al_2O_3$) or $TiO_2$, and optionally $SiO_2$, and the other of the inner wall surface of the inner half or the outer half may comprise $SiO_2$.

In embodiments, at least part of the inner wall surface of the inner half or of the outer half may comprise a self-assembled monolayer bearing charged functional groups or functional groups capable of being charged at a certain pH, while the other of the inner wall surface of the inner half or the outer half may not comprise such a self-assembled monolayer bearing charged functional groups or functional groups capable of being charged at a certain pH. A non-limiting example of a suitable self-assembled monolayer bearing a charged functional group capable of being charged at a certain pH is a layer formed from the reaction of (3-Aminopropyl) triethoxysilane molecules with the inner wall surface. Such a layer is positively charged when in acidic conditions. In embodiments, such as for instance in the example of FIG. 1, a self-assembled monolayer bearing a positive functional group could form at least part of the inner wall surface of the inner half, while the inner wall surface of the outer half would not be formed of the self-assembled monolayer and would, for instance, consist of $SiO_2$ or $TiO_2$ instead.

For differing first and second material compositions, the corresponding zeta potential at the inner wall surfaces of the first and second halves will typically likewise be different, thereby realizing a difference in charge density between both. In example embodiments of the second type have, for particular operating conditions, the closed loop nature of the capillary channel can be fully accounted for during device fabrication, without the need to make any changes before or during device operation. These embodiments may, however, be adapted to specific operating conditions and function in a less than desirable manner when these operating conditions are changed (e.g., when an electrolyte of a different pH is used). The difference in zeta potential can, in a first approximation, be linked to a difference in the isoelectric point between the first and second material compositions with respect to the operating pH. Nevertheless, it is noted that this is but a first approximation and that a finer approach may, in some instances, be used in order to accurately estimate the change in charge density that will be obtained for a particular change in material composition. For example, referring to FIG. 7 of Wang et al., Mat. Sci. Eng., 395, 148-152, 2005 in which the zeta potential of $\alpha$-$Al_2O_3$, silica ($SiO_2$), and silica coated with $\alpha$-$Al_2O_3$ is depicted as a function of pH, it can be seen that the zeta potential curves of silica and silica coated with $\alpha$-$Al_2O_3$ intersect around pH 5.5. As such, a material composition of $SiO_2$ coated with $\alpha$-$Al_2O_3$, as compared to pure $SiO_2$, would lead to a decrease in charge density (i.e., closer to neutral) at an operating pH above the intersection (e.g., pH 6 or more) but an increase (i.e., more negative) below said intersection (e.g., pH 5 or less). This conclusion could perhaps not be reached when comparing only the isoelectric point of $Al_2O_3$ and $SiO_2$. The above notwithstanding, suitable first and second material compositions as a function of a certain device geometry (e.g., angle or curvature of the turns) and operating conditions (e.g., operating pH) can be determined via simulations (e.g., computer simulations), etc.

It will be clear that the first and the second type can, in some embodiments, also be combined, i.e., a first and/or second charge-inducing structure may be combined with the inner wall surfaces of both halves having different material compositions. Thus, such embodiments can unite the ease-of-use of the second type with the flexibility of the first type (when needed), but require a more involved fabrication.

The capillary channel forms a closed loop. In embodiments, the outermost perimeter of the loop may be from 6 to 40 cm. The height and width (e.g., the diameter) of the (tube forming the) capillary channel are typically uniform along its perimeter. In embodiments, the height and width of the capillary channel may each be from 100 nm to 200 µm to 100 nm to 1 mm.

The charge density of the inner wall surface of the inner half does not need to be uniform. Similarly, the charge density of the inner wall surface of the outer half does not need to be uniform.

In embodiments, the difference between the first and the second charge densities between both halves may be realized by a difference in charge densities only existing or that can only be turned on in a portion of the inner wall surfaces.

Aspects are described herein with reference to a channel inner half facing toward a space enclosed by the loop formed by the channel, the channel inner half having an inner wall surface of first charge density, and to a channel outer half facing away from the space enclosed by the loop formed by the channel, the channel outer half having an inner wall surface of second charge density. A difference between the first and the second charge densities exists or can be turned on. The difference is configured to create a smaller average electroosmotic flow velocity in the channel inner half than in the channel outer half. However, since the channel forms a closed loop due to the presence of one or more turns, some aspects may also be described with reference to a turn inner half facing toward a space enclosed by the loop formed by the channel, the turn inner half having an inner wall surface of first charge density, and to a turn outer half facing away from the space enclosed by the loop formed by the channel, the turn outer half having an inner wall surface of second charge density. A difference between the first and the second charge densities exists or can be turned on. The difference is configured to create a smaller average electroosmotic flow velocity in the turn inner half than in the turn outer half. Hence, any embodiments disclosed herein can be expressed in terms of turn halves instead of channel halves.

In embodiments, the turn may, but does not need to be, a curved portion of the capillary channel, i.e., a smoothly curving portion of the capillary channel. The turn may, however, also be an angled portion such as, but not limited to, a right-angled portion.

When the turn is a curved portion of the capillary channel, the portion of the capillary channel belonging to the turn can correspond to the curved portion forming that turn. In other words, straight channel portions eventually present on each end of a curved portion do not belong to the turn.

When the turn is an angled portion of the capillary channel, there are no non-arbitrary ways to define what portion of the capillary channel belongs or does not belong to the turn. An angled portion of the capillary channel is an angle between straight portions of the capillary channel. This angle is separated from one or more adjacent turns by two straight portions of the capillary channel. An angled portion may always comprise the angle itself and some length of the two straight portions forming that angle. How much length of these two straight portions forms part of the turn is arbitrary. In embodiments, an angled portion will be considered as consisting of the angle itself and half the length of each of the two straight portions forming that angle. As an example, the angled portion could include the angle and one-third of the length of each of the two straight portions forming that angle.

In embodiments, the capillary channel may have at least two turns. As an example, the capillary could have at least three or four turns. A capillary channel with a single turn may, for example, be one with a circular or elliptical shape (i.e., wherein the capillary channel is substantially curved over its whole length) or a shape consisting of a curved portion and a straight portion. A capillary channel with two turns may correspond to a stretched oval shape having two straight portions in the stretched direction (e.g., a 'racetrack shape'). A capillary channel with three, four, five, six, etc., turns may respectively correspond to a triangular, tetragonal, pentagonal, hexagonal, etc., shape.

In embodiments, the difference between the first and the second charge densities between both halves may be realized by a difference in charge densities only existing or that can only be turned on at one or more turns of the channel inner wall surface. It is at turns that the difference in path length between the inner and the outer halves is created. It is usually more efficient to compensate for the difference in path length created at a turn by modifying the charge densities at that turn, even if it is also possible to compensate for it by modifying the charge densities at other sections of the halves.

When the turn is a curved portion of the capillary channel, the curved portion comprises a first inner wall surface portion at an inner curve (i.e., in the inner half) of the curved portion, the first inner wall surface portion having a first charge density, and a second inner wall surface portion at an outer curve (i.e., in the outer half) of the curved portion, the second inner wall surface portion having a second charge density, and, in embodiments, this is this difference between the first and the second charge densities that either exists or can be turned on.

Expressed differently, a particular embodiment of the first aspect relates to a cyclic capillary electrophoresis device, comprising a capillary channel having a curved portion, the curved portion comprising a first inner wall surface portion in the inner half of the capillary channel, the first inner wall surface portion having a first charge density, and a second inner wall surface portion in the outer half of the capillary channel, the second inner wall surface portion having a second charge density; the device being adapted so that (e.g., in operation) the first charge density differs or can differ from the second charge density (by being turned on), in such a way that an average electroosmotic flow velocity in the inner half of the curved portion is lower than the average electroosmotic flow velocity in the outer half of the curved portion.

When the turn is an angled portion of the capillary channel, the angled portion comprises a first inner wall surface portion in the inner half of the angled portion, the first inner wall surface portion having a first charge density, and a second inner wall surface portion in the outer half of the curved portion, the second inner wall surface portion having a second charge density, and, in embodiments, this is this difference between the first and the second charge densities that either exists or can be turned on.

Expressed differently, a particular embodiment of the first aspect relates to a cyclic capillary electrophoresis device, comprising a capillary channel having an angled portion, the angled portion comprising a first inner wall surface portion in the inner half of the capillary channel, the first inner wall surface portion having a first charge density, and a second inner wall surface portion in the outer half of the capillary channel, the second inner wall surface portion having a second charge density; the device being adapted so that (e.g., in operation) the first charge density differs or can differ from the second charge density (by being turned on), in such a way that an average electroosmotic flow velocity in the inner half of the angled portion is lower than the average electroosmotic flow velocity in the outer half of the angled portion.

Typically, when the average electroosmotic flow velocity in the inner half of a turn is lower than the average electroosmotic flow velocity in the outer half of the turn, this also means that the average electroosmotic flow velocity at any specific distance of the first inner wall surface portion is lower than an average electroosmotic flow velocity farther from the first inner wall surface portion than that specific distance.

Aspects are described with reference to channel halves or to turn halves, and with respect to a charge density difference configured to create a smaller average electroosmotic flow velocity in the inner half than in the outer half. However, instead of comparing average electroosmotic flow velocities existing in two halves, one could compare two electroosmotic flow velocities situated at different distances from the innermost perimeter of the channel or from the innermost periphery of a turn of the channel (wherein the innermost periphery of a turn of the channel is comprised in the innermost perimeter of the channel).

For instance, an embodiment may relate to a cyclic capillary electrophoresis device comprising a capillary channel forming a closed loop. The capillary channel comprises:

a first inner wall surface portion comprising an innermost perimeter of the channel, the first inner wall surface portion having a first charge density, and
a second inner wall surface portion, not overlapping with the first inner wall surface portion, and comprising an outermost perimeter of the channel, the second inner wall surface portion having a second charge density.

A difference between the first and the second charge densities exist or can be turned on. The difference is adapted for creating a smaller electroosmotic flow velocity for a first location in the channel nearer the innermost perimeter than for a second location in the channel farther from the innermost perimeter than the first location.

Similarly, embodiments may relate to a cyclic capillary electrophoresis device comprising a capillary channel forming a closed loop and comprising at least one turn. The turn comprises:

a first inner wall surface portion comprising an innermost periphery of the turn, the first inner wall surface portion having a first charge density, and
a second inner wall surface portion, not overlapping with the first inner wall surface portion, and comprising an outermost periphery of the channel, the second inner wall surface portion having a second charge density.

A difference between the first and the second charge densities exist or can be turned on. The difference is adapted for creating a smaller electroosmotic flow velocity for a first location in the turn nearer the innermost periphery than for a second location in the turn farther from the innermost periphery than the first location.

In embodiments, the cyclic capillary electrophoresis device may be a microfluidic device, such as a being, or being integrated into, a lab-on-a-chip (e.g., a mobile point-of-care device). In embodiments, the cyclic capillary electrophoresis device and/or the lab-on-a-chip may have a footprint under 10 $cm^2$. In embodiments, the cyclic capillary electrophoresis device may have a 1 base-pair resolution, i.e., resolving two oligonucleotide strands differing only by the presence of one additional base pair on one of both strands.

An example of the cyclic capillary electrophoresis device further comprises electrophoretic electrodes for creating a potential difference between separated sections along the capillary channel. In embodiments, the potential difference may be from 200 V to 10 kV. These electrodes are responsible for the electrophoretic effect on the analytes and electroosmotic effect on the electrolyte. These electrodes are arranged in the device in such a way as to be electrically coupled to the electrolyte when it is present in the capillary channel. In embodiments, these electrodes can be exposed to the lumen of the capillary channel. This permits the electrodes to be in electrical contact with the electrolyte when it is present in the capillary channel. Preferably, they are arranged in a top cover of the device. Typically, at least three such electrodes are used. Preferably, the electrophoretic electrodes are equally spaced along the channel. The electrophoretic electrodes are connectable to a power supply in such a way that a potential difference can be created between non-successive electrophoretic electrodes. In embodiments, the electrophoretic electrodes are connectable to a power supply in such a way that a potential difference can be created between any pair of non-successive electrophoretic electrodes. In embodiments, the electrophoretic electrodes are connectable to a power supply in such a way that a potential difference can be created between any pair of electrophoretic electrodes separated by a single electrophoretic electrode.

Typically, the connection of the electrophoretic electrodes to the power supply can be controlled in such a way that a potential difference can successively be created between different pairs of non-successive electrophoretic electrodes in such a way that the sample travels a complete lap and preferably a plurality of laps around the channel. Hence, in embodiments, the device may comprise a controller electrically coupling the power supply and the electrophoretic electrodes. The controller is configured to successively create a potential difference between different pairs of non-successive electrophoretic electrodes in such a way that the sample travels a complete lap and preferably a plurality of laps around the channel.

The cyclic capillary electrophoresis device may further comprise reservoirs, formed in the substrate and fluidly coupled to the channel, for storing electrolyte. Each reservoir may be present on an electrical path coupling an electrophoretic electrode and the electrolyte when it is present in the channel. These reservoirs can be used to inject or remove fluid from the capillary channel.

In embodiments, the cyclic capillary electrophoresis device may further comprise a detector for detecting a sample front. The detector may be configured to evaluate the angle between a sample front and the electrolyte flow direction. In embodiments, one or more windows may be present in the capillary channel for allowing the detector to detect the sample front.

In embodiments, when a first and/or a second charge inducing structure is present, and when a detector is present, the cyclic capillary electrophoresis device may further comprise a controller for automatically adapting the charge density induced by the first and/or a second charge inducing structure to the sample front angle detected by the detector in such a way as to bring the sample front angle to a perpendicular to the electrolyte flow direction.

In embodiments, the cyclic capillary electrophoresis device may comprise:
a substrate having a capillary channel therein, the capillary channel forming a closed loop, the capillary channel having an open top,
a top cover bonded to the substrate, thereby forming a capillary channel having a closed top.
The capillary channel having the closed top comprises:
an inner half facing toward a space enclosed by the loop, the inner half (201) having an inner wall surface of first charge density, and
an outer half facing away from the space enclosed by the loop, the outer half having an inner wall surface of second charge density;

A difference between the first and the second charge densities exists or can be turned on. The difference is adapted for creating a smaller average electroosmotic flow velocity in the inner half than in the outer half. Any features of this embodiment may be as correspondingly described for any other embodiment of the first aspect. In this embodiment, when at least part of the inner wall surface of the inner half or of the outer half comprises a self-assembled monolayer bearing charged functional groups or functional groups capable of being charged at a certain pH, while the other of the inner wall surface of the inner half or the outer half does not comprise such a self-assembled monolayer bearing charged functional groups or functional groups capable of being charged at a certain pH, then, in an example, the top cover is transparent to wavelengths below 388 nm (e.g., below 200 nm). Indeed, in many embodiments, such a transparent top cover eases the fabrication of such a self-assembled monolayer. In embodiments where the top cover is transparent to wavelengths below 388 nm, the inner wall surface of the channel may consist of portions where the self-assembled monolayer is present and portions where the self-assembled monolayer is not present and a photocatalytic surface is present instead. In embodiments where the top cover is transparent to wavelengths below 200 nm, the inner wall surface of the channel may consist of portions where the self-assembled monolayer is present and portions where the self-assembled monolayer is not present (and, in embodiments, no photocatalytic surface is present instead).

Any feature of any embodiment of the first aspect may independently be as correspondingly described for any embodiment of any of the other aspects.

A second aspect relates to a method for forming a cyclic capillary electrophoresis device as defined in any embodiment of the first aspect. The method comprises:

(a) forming a capillary channel in a substrate, the capillary channel forming a closed loop, the capillary channel comprising:
An inner half facing toward a space enclosed by the loop, the inner half having an inner wall surface, and
An outer half facing away from the space enclosed by the loop, the outer half having an inner wall surface;
b'. Forming in the substrate a first charges-inducing structure capable of being turned on to induce charges on at least part of the inner wall surface of the inner half, and/or forming in the substrate a second charges-inducing structure capable of being turned on to induce charges on at least part of the inner wall surface of the outer half, and/or
b". Modifying a material composition of the inner wall surface of the inner half and/or of the inner wall surface of the outer half, said modification creating a difference in charge density between the inner wall surface of the inner half and the inner wall surface of the outer half;
and (c) bonding a cover to the substrate, thereby closing the capillary channel.

The method thus comprises at least one of forming the first charge-inducing structure, forming the second charge-inducing structure, modifying the material composition of the inner wall surface of the inner half, and modifying the material composition of the inner wall surface of the outer half; and optionally multiple or all thereof.

The capillary channel formed in step (a) has its inner wall surface exposed, i.e., it is a groove; it has no top.

In embodiments, the substrate may be a semiconductor (e.g., Si), glass, or polymer substrate.

In embodiments, step (a) may comprise: (a1) etching the capillary channel into the substrate, and (a2) lining the capillary channel with an insulator (e.g., $SiO_2$).

In embodiments, step b' may be performed before step (a) and may comprise: (b' 1) etching a cavity in the substrate, (b'2) forming a dielectric region occupying a first portion of the cavity, and (b'3) forming a conductive region, on the dielectric region, and occupying a second portion of the cavity. In embodiments, step b'2 of forming the dielectric region occupying the first portion of the cavity may comprise lining the cavity with a dielectric (e.g., $SiO_2$). In embodiments, step b'3 may comprise filling the cavity with a conductor (e.g., a metal).

In embodiments, step b" may comprise depositing a charge density modifying material onto the inner wall surface of the inner half, selectively with respect to the inner wall surface of the outer half, or onto the inner wall surface of the outer half, selectively with respect to the inner wall surface of the inner half. In embodiments, step b" may comprise depositing a further charge density modifying material onto the inner wall surface of the outer half, selectively with respect to the inner wall surface of the inner half, or onto the inner wall surface of the inner half, selectively with respect to the inner wall surface of the outer half. In embodiments, step b" may comprise altering the material composition of the inner wall surface of the inner and/or outer half (i.e., compared to the corresponding material composition prior to step b"). In embodiments, the altered material composition(s) may have an altered zeta potential. In embodiments, the charge density of the inner wall surface portion of the inner half may be made more neutral (i.e., less charged or closer to neutral than it was originally) and/or the charge density of the inner wall surface portion of the outer half may be made less neutral (i.e., farther from being neutral than it was originally, i.e., more charged, e.g., such as more negative or more positive).

In embodiments, the charge density of the inner wall surface of the inner half may be closer to being neutral than the charge density of the inner wall surface of the outer half. Both inner wall surfaces have a charge density of the same sign, or one of both inner wall surfaces has a neutral charge density. In embodiments, the charge density modifying material may have an isoelectric point differing from that of the material composition prior to step b" (but see supra). In embodiments, the charge density modifying material may be $Al_2O_3$ or $TiO_2$.

Hereafter, a series of six embodiments making use of light and a self-assembled monolayer to facilitate the aspects of step b" will be described.

Figure 6A:
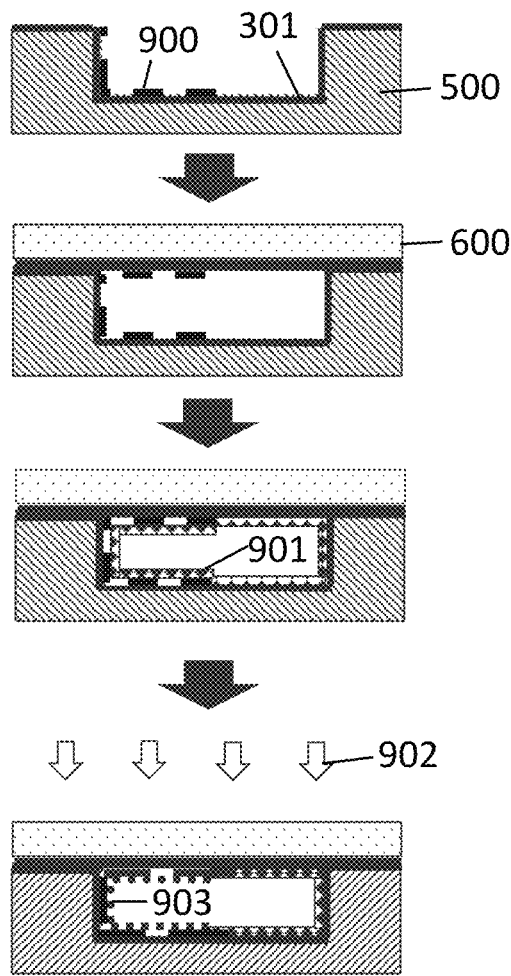
FIGS. 6A-6B are further schematic depictions of the fabrication of cyclic capillary electrophoresis devices, in accordance with example embodiments

In a first such embodiment, illustrated in FIG. 6A, steps b" and c may together comprise the following steps:
 (i) forming a photocatalytic film (900) on the inner wall surface (301) of the outer half or on the inner wall surface of the inner half,
 (ii) forming a photocatalytic film (900) on a portion of a cover (600), the cover being transparent to wavelengths suitable for activating the photocatalytic film (900) (e.g., below 388 nm if the photocatalytic film is $TiO_2$),
 (iii) bonding the cover to the substrate (500) in such a way that the portion of the cover having the photocatalytic film thereon forms part of the outer half or of the inner half if the step (i) was performed in the outer half or in the inner half respectively, thereby closing the channel,
 (iv) Forming a self-assembled monolayer (901), bearing charged functional groups or functional groups capable of being charged at a certain pH, in the closed channel where the photocatalytic film is present and where the photocatalytic film is absent, and
 (v) Irradiating the channel with a light (902) having wavelengths suitable for activating the photocatalytic film (900) (e.g., below 388 nm if the photocatalytic film is $TiO_2$), thereby activating the photocatalytic film, thereby triggering a degradation (903) of the self-assembled monolayer present on said photocatalytic film.

Figure 6B:
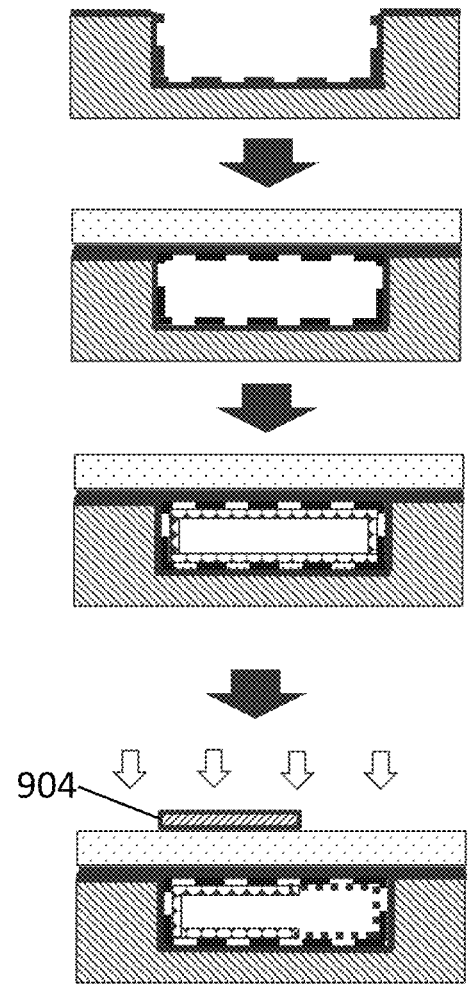

In a second such embodiment, illustrated in FIG. 6B, steps b" and c may together comprise the following steps:
 (i) forming a photocatalytic film on the inner wall surface of both, the outer half and the inner half,
 (ii) forming a photocatalytic film on at least a portion of a cover, the cover being transparent to wavelengths below 388 nm,
 (iii) bonding the cover to the substrate in such a way that the portion of the cover having the photocatalytic film thereon forms part of both the outer half and the inner half, thereby closing the channel,
 (iv) Forming a self-assembled monolayer, bearing charged functional groups or functional groups capable of being charged at a certain pH, in the closed channel where the photocatalytic film is present, and
 (v) Irradiating the channel with a light having wavelengths suitable for activating the photocatalytic film (900) (e.g., below 388 nm if the photocatalytic film is $TiO_2$) through a mask (904) covering either only the inner half or only the outer half, thereby activating the photocatalytic film in respectively only the outer half or only the inner half, thereby triggering a degradation of the self-assembled monolayer present on said photocatalytic film in said outer half or inner half respectively.

Figure 7:
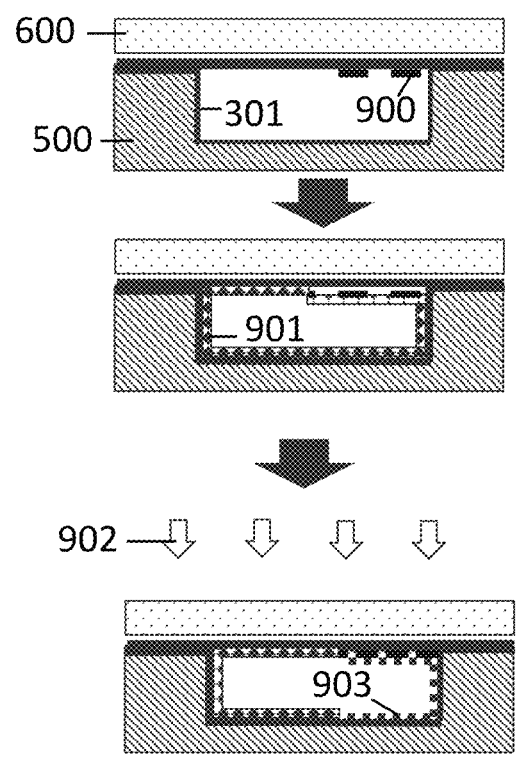
FIG. 7 is a further schematic depiction of the fabrication of cyclic capillary electrophoresis devices, in accordance with example embodiments In the different figures, the same reference signs refer to the same or analogous elements. All the figures are schematic, not necessarily to scale, and generally only show parts that are necessary to elucidate example embodiments, wherein other parts may be omitted or merely suggested.

In a third such embodiment, illustrated in FIG. 7, steps b" and c may together comprise the following steps:
 (i) forming a photocatalytic film (900) on a portion of a cover (600), the cover being transparent to a light having wavelengths suitable for activating the photocatalytic film (900) (e.g., below 388 nm if the photocatalytic film is $TiO_2$),
 (ii) bonding the cover to the substrate (500) in such a way that the portion of the cover having the photocatalytic film thereon forms part of either the outer half or the inner half, thereby closing the channel,
 (iii) Forming a self-assembled monolayer (901), bearing charged functional groups or functional groups capable of being charged at a certain pH, in the closed channel where the photocatalytic film is present and where the photocatalytic film is absent, and
 (iv) Irradiating the channel with a light (902) having wavelengths suitable for activating the photocatalytic film (900) (e.g., below 388 nm if the photocatalytic film is $TiO_2$), thereby activating the photocatalytic film, thereby triggering a degradation (903) of the self-assembled monolayer present on said photocatalytic film.

In a fourth such embodiment, not illustrated, steps b" and c may together comprise the following steps:
 (i) forming a photocatalytic film on a cover, the cover being transparent to a light having wavelengths suitable for activating the photocatalytic film (900) (e.g., below 388 nm if the photocatalytic film is $TiO_2$),
 (ii) bonding the cover to the substrate in such a way that the portion of the cover having the photocatalytic film thereon forms part of both the outer half and the inner half, thereby closing the channel,
 (iii) Forming a self-assembled monolayer, bearing charged functional groups or functional groups capable of being charged at a certain pH, in the closed channel where the photocatalytic film is present and where the photocatalytic film is absent, and
 (iv) Irradiating the channel with a light having wavelengths suitable for activating the photocatalytic film (900) (e.g., below 388 nm if the photocatalytic film is $TiO_2$) through a mask covering either only the inner half or only the outer half, thereby activating the photocatalytic film, thereby triggering a degradation of the self-assembled monolayer present on the walls of the outer half or the inner half respectively.

In a fifth such embodiment, illustrated in FIGS. 5A and 5C, steps b" and c may together comprise the following steps:
 (i) Forming a self-assembled monolayer (901) bearing charged functional groups or functional groups capable of being charged at a certain pH on the inner wall surface of the outer half and the inner half,
 (ii) Forming a self-assembled monolayer on a cover (600), the cover being transparent to wavelengths below 200 nm,
 (iii) bonding the cover to the substrate in such a way that the self-assembled monolayer on the cover form part of both the inner half and the outer half, thereby closing the channel,
 (iv) Irradiating the channel with a light (902) having wavelengths suitable for degrading the self-assembled monolayer (e.g., below 200 nm) through a mask (904) covering either only the inner half or only the outer half, thereby triggering a degradation (903) of the self-assembled monolayer present on the walls of the outer half or the inner half respectively.

In a sixth such embodiment, illustrated in FIGS. 5B and 5C, steps b'' and c may together comprise the following steps:
- (i) bonding a cover to the substrate, thereby closing the channel,
- (ii) Forming a self-assembled monolayer bearing charged functional groups or functional groups capable of being charged at a certain pH in the closed channel, and
- (iii) Irradiating the channel with a light (902) suitable for degrading the self-assembled monolayer (e.g., having wavelengths below 200 nm) through a mask (904) covering either only the inner half or only the outer half, thereby triggering a degradation (903) of the self-assembled monolayer present on the walls of the outer half or the inner half respectively.

In these six embodiments making use of a self-assembled monolayer and of light to facilitate the aspects of step b'', one or more of the following may apply:
- The capillary channel in the substrate provided in step a may be lined with a dielectric oxide (e.g., $SiO_2$, as depicted in FIGS. 5A-5C, 6A-6B, and 7) before being coated with a photocatalytic film or a self-assembled monolayer and before being bonded to the cover.
- The photocatalytic film may be a $TiO_2$ film.
- When the photocatalytic film is formed only on the inner wall surface of the outer half or of the inner half, this can be achieved by forming the photocatalytic film on both the inner half and the other half, then patterning the deposited film by lithography.
- When the photocatalytic film is formed on only a portion of the cover, this can be achieved by forming the film on the entire cover, then patterning the deposited film by lithography.
- The cover may be lined with a dielectric oxide (e.g., $SiO_2$, as depicted in FIGS. 5, 6, and 7) before being coated with a photocatalytic film and before being bonded to the substrate. Such a lining may be used when the cover is not itself made of such an oxide (e.g., when the cover is not quartz or fused silica) as it has the double function of easing anodic bonding and of planarizing the cover surface. When the cover is made of such an oxide (e.g., when the cover is made of quartz or fused silica), such a lining is less useful but the surface can be planarized if it comprises irregularities or if electrodes have been patterned thereon).
- Bonding the cover to the substrate may be performed by anodic bonding or gluing.
- The self-assembled monolayer may be formed by chemical vapor deposition or by liquid deposition.
- The photocatalytic film may be activatable upon irradiation with wavelengths below 388 nm, e.g., by forming oxidative species upon exposure to light comprising wavelengths below 388 nm.
- When a light having wavelengths suitable for activating the photocatalytic film (900) (e.g., below 388 nm if the photocatalytic film is $TiO_2$) is used, this light preferably does not comprise wavelength below 200 nm (so as not to degrade the self-assembled monolayer away from the photocatalytic film).
- The mask may be a chromium mask, which can improve resolution.
- When irradiation is performed with a light having wavelengths below 200 nm, the cover is preferably made of fused silica or quartz.
- The inner half may be a turn inner half as expressed in the first aspect.
- The outer half may be a turn outer half as expressed in the first aspect.

In embodiments, step c may comprise anodic bonding of the cover. In embodiments, the cover may be a semiconductor (e.g., Si), glass, quartz, or polymer substrate. In embodiments, the cover may further comprise electrophoretic electrodes, e.g., for inducing an electrophoretic flow.

Any feature of any embodiment of the second aspect may independently be as correspondingly described for any embodiment of any of the other aspects.

A third aspect relates to a use of a cyclic capillary electrophoresis device according to any embodiment of the first aspect, for equalizing a migration time in the inner half with a migration time in the outer half.

In embodiments, the migration time may be an electroosmotic migration time, i.e., the migration time of the electrolyte. This migration time can, for instance, be for effectuating a lap of the channel or for passing completely a turn (e.g., any turn).

In embodiments, the migration time may be a migration time of any two identical analytes for effectuating a lap of the channel or for passing completely a turn (e.g., any turn).

In embodiments, equalizing a migration time of any two identical analytes for effectuating a lap of the channel may result in migration times differing by less than 20%, preferably less than 10%, yet more preferably less than 5%.

In embodiments where the capillary channel has at least two turns, an equalizing a migration time of any two identical analytes for passing completely any turn may result in migration times differing by less than 20%, less than 10%, and even less than 5%.

In embodiments, any feature of any embodiment of the third aspect may independently be as correspondingly described for any embodiment of any of the other aspects.

Additional example embodiments are described below. It is clear that other example embodiments can be configured according to the knowledge of the person skilled in the art without departing from the true technical teachings disclosed herein and that such examples embodiments are understood to fall within the scope of the claims.

EXAMPLE

Fabrication of Cyclic Capillary Electrophoresis Devices

Example A

Cyclic Capillary Electrophoresis Device with Charge-Inducing Structures

A silicon wafer, to be used as a substrate (500), is first cleaned, e.g., with hot acetone, hot isopropanol, and a 5 min $O_2$ plasma organic cleaning.

Figure 2A:
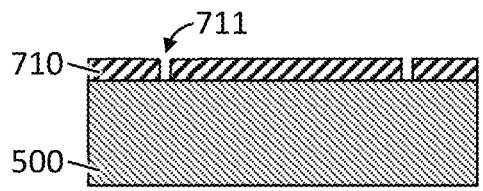
FIGS. 2A-2K schematically depict the fabrication of cyclic capillary electrophoresis devices, in accordance with example embodiments.

Referring to FIG. 2A, a first lithographically patterned mask (710), e.g., with a positive tone photoresist, is provided over the substrate (500).

Figure 2B:
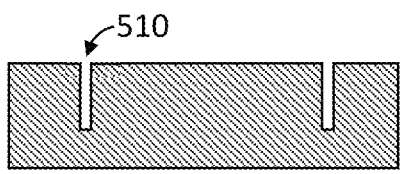

Referring to FIG. 2B, the first pattern is transferred into the substrate (500) by etching the substrate (500) through the openings (711) defined in the first lithographically patterned mask (710), thereby defining cavities (510) with a width of about 20 μm and a depth corresponding to the channel depth.

Figure 2C:
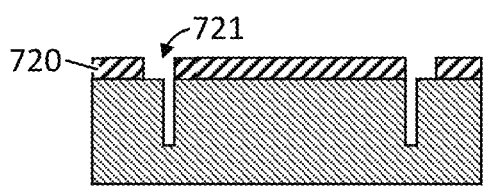

Referring to FIG. 2C, a second lithographically patterned mask (720), e.g., with a positive tone photoresist, is provided over the substrate (500), overlapping the first pattern.

Figure 2D:
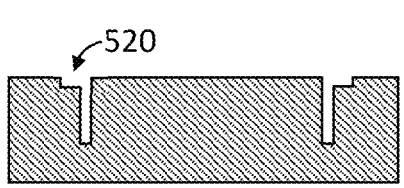

Referring to FIG. 2D, the second pattern is transferred into the substrate (500) by etching the substrate (500)

through the openings (721) defined in the second lithographically patterned mask (720), thereby defining cavities (520) with a width of about 50 µm and a depth of about 200 nm.

Figure 2E:
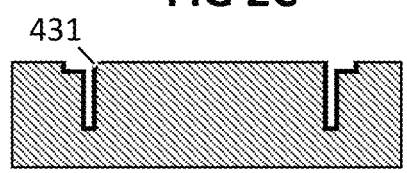

Referring to FIG. 2E, in order to provide enough electrical insulation during voltage application in device operation, the etched surfaces are then passivated by evaporating (e.g., by plasma-enhanced chemical vapor deposition) or thermal growth of a $SiO_2$ dielectric lining (431).

Figure 2F:

Referring to FIG. 2F, the etched cavities (510, 520) are filled with a metal (432), e.g., using autocatalysis, low-melting-point solder, or electrodeposition. The metal is for use as an electrode (432) of the charge-inducing structures (410, 420).

Figure 2G:

Referring to FIG. 2G, any excess metal electrode (432) overfilling the cavities (510, 520) is removed, e.g., by a chemical-mechanical planarization.

Figure 2H:
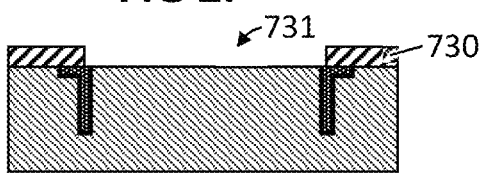

Referring to FIG. 2H, a third lithographically patterned mask (730), e.g., with a positive tone photoresist, is provided over the substrate (500) for defining a capillary channel (200) forming a closed loop. The third lithographically patterned mask (730) is therefore arranged over the substrate (500) such that the charge-inducing structures (410, 420) are present at an inner wall of the inner half and an inner wall surface of the outer half of the capillary channel (e.g., such a charge-inducing structure could be present either at each turn of the capillary channel if it comprises two or more turns or along the whole channel length if it comprises only one turn); i.e., a first charge-inducing structure (410) comprises a first inner wall surface portion (310) in the inner half and a second charge-inducing structure (420) comprises a second inner wall surface portion (320) in the outer half.

Figure 2I:
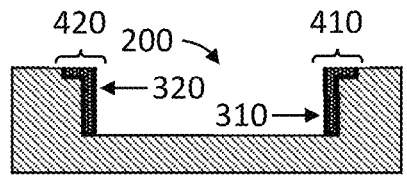

Referring to FIG. 2I, the third pattern is transferred into the substrate (500) by etching the substrate (500) through the opening (731) defined in the third lithographically patterned mask (730) and using the metal (432) as an etch barrier, thereby defining the capillary channel (200).

Figure 2J:

Referring to FIG. 2J, the substrate (500) is covered with a $SiO_2$ layer (301) to provide electrical insulation.

Figure 2K:
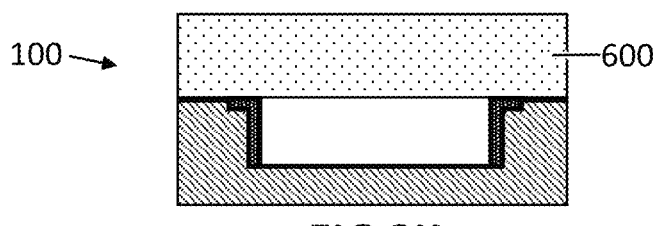

Referring to FIG. 2K, the substrate (500) is then bonded to a cover (600; e.g., a glass substrate), for example, using anodic bonding. The cover (600) can have been previously furnished (not depicted) with electrophoretic electrodes by depositing 100 nm Au or Pt metal thereon using Cr or Ti as an adhesion layer, followed by patterning the deposited metal to define the electrophoretic electrodes.

Finally (not depicted), the device (100) can be wire bonded to a printed circuit board for controlling the system.

In the above-described process, two charge-inducing structures are formed, the first in the inner half and the second at the outer half of one of the capillary channel's turn. However, it will be clear that only a single charge-inducing structure (at either the inner or the outer half) could likewise be formed.

Example B

Cyclic Capillary Electrophoresis Device with Different First and Second Material Compositions A silicon wafer, to be used as a substrate (500), is first cleaned, e.g., with hot acetone, hot isopropanol, and a 5 min $O_2$ plasma organic cleaning.

Referring to FIG. 3A, a lithographically patterned mask (730), e.g., with a positive tone photoresist, is provided over the substrate (500) for defining a capillary channel (200) forming a closed loop.

Referring to FIG. 3B, the pattern is transferred into the substrate (500) by etching the substrate (500) through the opening defined in the lithographically patterned mask (730), thereby defining the capillary channel (200).

Referring to FIG. 3C, the substrate (500) is covered with a $SiO_2$ layer (301) to provide electrical insulation.

Referring to FIG. 3D, the material composition of select areas of the capillary channel (200) is then modified, e.g., that of the inner wall surface (310) in the inner half or that of the inner wall surface (320) at the outer half. To that end, as a charge density modifying material (311), for example, $Al_2O_3$ can first be deposited on OH-terminated sites of the substrate (500) using atomic layer deposition, e.g., through alternate exposures with $Al(CH_3)_3$ (trimethylaluminum or TMA) and $H_2O$ or $O_3$. The charge density modifying material (311) is then covered with a photoresist, e.g., deposited by spray coating or spin coating so as to ensure sufficiently good coverage of the entire channel wall. A pattern is subsequently lithographically defined and developed in the photoresist, thereby exposing those portions of the channel wall where the charge density modifying material (311) is again to be removed. Next, the charge density modifying material (311) is again removed in said exposed areas, e.g., using tetramethylammonium hydroxide (TMAH or OPD5262).

Figure 3E:
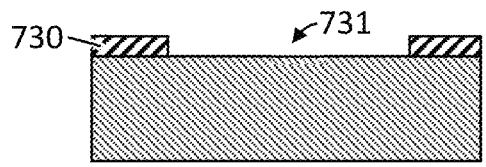
Figure 3E:
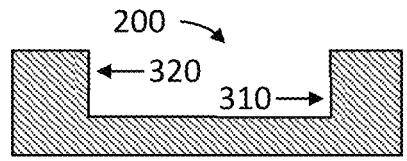
Figure 3E:
Figure 3E:
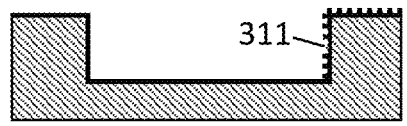
Figure 3E:
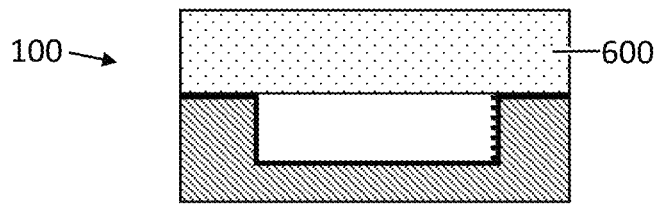

Referring to FIG. 3E, the substrate (500) is then bonded to a cover (600; e.g., a glass substrate), e.g., using anodic bonding. The cover (600) can have been previously furnished (not depicted) with electrophoretic electrodes by depositing 100 nm Au or Pt metal using Cr or Ti as an adhesion layer, followed by patterning the deposited metal.

Finally (not depicted), the device (100) can be wire bonded to a printed circuit board for controlling the system.

Example C

Cyclic Capillary Electrophoresis Device with Both Charge-Inducing Structures and Different First and Second Material Compositions Example A and example B can also be combined by repeating example A up to and including the step relating to FIG. 2J and subsequently repeating example B from the step relating to FIG. 3D onwards.

While some embodiments have been illustrated and described in detail in the appended drawings and the foregoing description, such illustration and description are to be considered illustrative and not restrictive. For example, any formulas given above are merely representative of procedures that may be used. Steps may be added or deleted to any of the methods described herein. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:
1. A cyclic capillary electrophoresis device comprising:
a capillary channel, wherein the capillary channel forms a closed loop, and wherein the capillary channel includes:
an inner half formed into a substrate and including a vertical inner wall surface defining an inner perim- eter of the closed loop wherein the vertical inner wall surface is charged to a first charge density; and an outer half formed into the substrate opposite to the inner half and including a vertical inner wall surface defining an outer perimeter of the closed loop wherein the vertical inner wall surface is charged to a second charge density, wherein the vertical inner wall surface of the inner perimeter and the vertical inner wall surface of the outer perimeter are formed parallel to each other, and are enclosed by a cover arranged to close the closed loop formed into the substrate, a charge density difference generated between the first charge density maintained at the vertical inner wall surface of the inner half and the second charge density maintained at the vertical inner wall surface of the outer half, and a first electroosmotic flow velocity generated in response to the charge density difference adjacent to the inner wall surface of the inner half and a second electroosmotic flow velocity generated in response to the charge density difference adjacent to the inner wall surface of the outer half and wherein the difference between the first and second electroosmotic flow velocities occurs between the inner half and the outer half along a plane traverse to a fluid flow within the closed loop defined between the inner perimeter and the outer perimeter.

2. The cyclic capillary electrophoresis device according to claim 1, wherein the charge density difference is configured to achieve a same migration time to close the loop for an analyte in the inner half as for the same analyte in the outer half.

3. The cyclic capillary electrophoresis device according to claim 1, wherein the inner wall surface of the outer half is negatively charged.

4. The cyclic capillary electrophoresis device according to claim 1, wherein the charge density difference is such that the first charge density is closer to being neutral than the second charge density.

5. The cyclic capillary electrophoresis device according to claim 1, wherein the cyclic capillary electrophoresis device is a microfluidic device.

6. The cyclic capillary electrophoresis device according to claim 5, wherein the charge density difference is configured to achieve a same migration time to close the loop for an analyte in the inner half as for the same analyte in the outer half.

7. The cyclic capillary electrophoresis device according to claim 6, wherein the inner wall surface of the outer half is negatively charged.

8. The cyclic capillary electrophoresis device according to claim 7, wherein the charge density difference is such that the first charge density is closer to being neutral than the second charge density.

9. The cyclic capillary electrophoresis device according to claim 1, comprising:
a first charge-inducing structure configured to be turned on to induce charges on at least part of the inner wall surface of the inner half, and
a second charge-inducing structure configured to be turned on to induce charges on at least part of the inner wall surface of the outer half.

10. The cyclic capillary electrophoresis device according to claim 1, wherein the inner wall surface of the inner half has a first material composition and the inner wall surface of the outer half has a second material composition, the first material composition is different from the second material composition.

11. The cyclic capillary electrophoresis device according to claim 10, wherein one of the inner wall surface of the inner half or of the outer half comprises $Al_2O_3$ or $TiO_2$, and optionally $SiO_2$, and the other of the inner wall surface of the inner half or the outer half comprises $SiO_2$.

12. The cyclic capillary electrophoresis device according to claim 1, wherein the capillary channel has at least two turns.

13. A method for forming a cyclic capillary electrophoresis device according to claim 1, comprising:
forming the capillary channel in the substrate, the capillary channel forming the loop that is closed;
forming in the substrate a first charge-inducing structure configured to be turned on to induce charges on at least part of the inner wall surface of the inner half;
forming in the substrate a second charge-inducing structure configured to be turned on to induce charges on at least part of the inner wall surface of the outer half;
modifying a material composition of the inner wall surface of the inner half and of the inner wall surface of the outer half, wherein the modification creates the charge density difference between the inner wall surface of the inner half and the inner wall surface of the outer half; and
bonding a cover to the substrate to thereby close the capillary channel.

14. The method according to claim 13, wherein forming in the substrate the first charge-inducing structure comprises:
etching a cavity in the substrate;
forming a dielectric region in a first portion of the cavity; and
forming a conductive region on the dielectric region in a second portion of the cavity.

15. The method according to claim 14, wherein etching the cavity, forming the dielectric region, and forming the conductive region are performed before forming the capillary channel.

16. The method according to any of claim 15, wherein forming the capillary channel comprises:
etching the capillary channel into the substrate; and
lining the capillary channel with an insulator.

17. The method according to claim 16, wherein modifying the material composition comprises depositing a charge density modifying material onto the inner wall surface of the inner half, selectively with respect to the inner wall surface of the outer half, or onto the inner wall surface of the outer half, selectively with respect to the inner wall surface of the inner half.

18. The method according to any of claim 13, wherein forming the capillary channel comprises:
etching the capillary channel into the substrate; and
lining the capillary channel with an insulator.

19. The cyclic capillary electrophoresis device according to claim 1, wherein the substrate includes an insulation layer.

20. The cyclic capillary electrophoresis device according to claim 19, wherein the insulation layer is a $SiO_2$ layer.

* * * * *